(12) United States Patent
Marr et al.

(10) Patent No.: US 9,391,684 B1
(45) Date of Patent: Jul. 12, 2016

(54) ASYMMETRIC POWER AMPLIFIER FOR DIGITAL BEAM FORMING

(71) Applicant: RAYTHEON COMPANY, Waltham, MA (US)

(72) Inventors: Harry Marr, Manhattan Beach, CA (US); Jeffery Jay Logan, Redondo Beach, CA (US); David Couto, Pepperell, MA (US); Chad Patterson, Marina Del Rey, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/851,532

(22) Filed: Sep. 11, 2015

(51) Int. Cl.
*H04L 25/03* (2006.01)
*H04B 7/06* (2006.01)
*H04B 1/04* (2006.01)

(52) U.S. Cl.
CPC ............... *H04B 7/0617* (2013.01); *H04B 1/04* (2013.01); *H04B 2001/0408* (2013.01)

(58) Field of Classification Search
CPC .. H04B 1/0475; H04B 1/0057; H04B 1/0078; H04B 1/02; H04B 1/0483; H04B 2001/0408; H04B 1/0053; H04B 1/0067; H03F 3/24; H03F 2200/111; H03F 2200/168; H03F 1/3252
USPC ............................ 375/295–297; 330/250, 251
See application file for complete search history.

(56) References Cited

U.S. PATENT DOCUMENTS

| | | | | |
|---|---|---|---|---|
| 7,889,751 B2* | 2/2011 | Aggarwal | ............ | H04L 27/362 370/419 |
| 8,022,768 B1* | 9/2011 | Bowles | ................ | H03F 1/0261 330/295 |
| 8,137,280 B2* | 3/2012 | Angelsen | ............ | G01S 7/52025 600/447 |
| 8,810,312 B2* | 8/2014 | Kim | ...................... | H03F 1/0288 330/124 R |
| 8,948,301 B2* | 2/2015 | Rollins | ................. | H04L 27/368 375/285 |
| 2003/0179832 A1* | 9/2003 | Greenwood | ............. | H04L 5/06 375/297 |
| 2009/0232191 A1* | 9/2009 | Gupta | ................. | H04L 27/2096 375/216 |
| 2013/0196714 A1* | 8/2013 | Yin | ........................ | H01L 23/66 455/561 |
| 2014/0118072 A1* | 5/2014 | Briffa | ..................... | H03F 1/025 330/295 |
| 2015/0049841 A1* | 2/2015 | Laporte | ............... | H04B 1/0475 375/297 |
| 2015/0139348 A1* | 5/2015 | Tong | ...................... | H04B 7/068 375/267 |
| 2015/0163079 A1* | 6/2015 | Rollins | ................. | H04L 27/368 375/296 |

* cited by examiner

*Primary Examiner* — Tesfaldet Bocure
(74) *Attorney, Agent, or Firm* — Lewis Roca Rothgerber Christie LLP (57) ABSTRACT

An asymmetric power amplifier includes: an input port for receiving a multi carrier signal including a first subcarrier and a second subcarrier; a first tunable analog filter for filtering the received multi carrier signal into a first signal of the first subcarrier; a second tunable analog filter for filtering the received multi carrier signal into a second signal of the second subcarrier; an amplifier for amplifying the first signal of the first subcarrier; a power amplifier for power amplifying the second signal of the second subcarrier; a combiner for power combining the amplified first signal and the amplified second signal to form a power combined multi carrier signal; and an output port for outputting the power combined multi carrier signal to be transmitted by a transmitter.

14 Claims, 7 Drawing Sheets

ASYMMETRIC POWER AMPLIFIER FOR DIGITAL BEAM FORMING

FIELD OF THE INVENTION

The present invention relates generally to beam forming techniques and power amplifiers and more specifically to an asymmetric power amplifier for digital beam forming.

BACKGROUND

An antenna array is a group of multiple active antennas coupled to a common source or load to produce a directive radiation pattern. Usually, the spatial relationship of the individual antennas also contributes to the directivity of the antenna array. A phased array antenna is an array of antennas in which the relative phases of the signals feeding the antennas are varied in a manner that the effective radiation pattern of the entire array is reinforced in a desired direction and suppressed in undesired directions.

Figure 1:
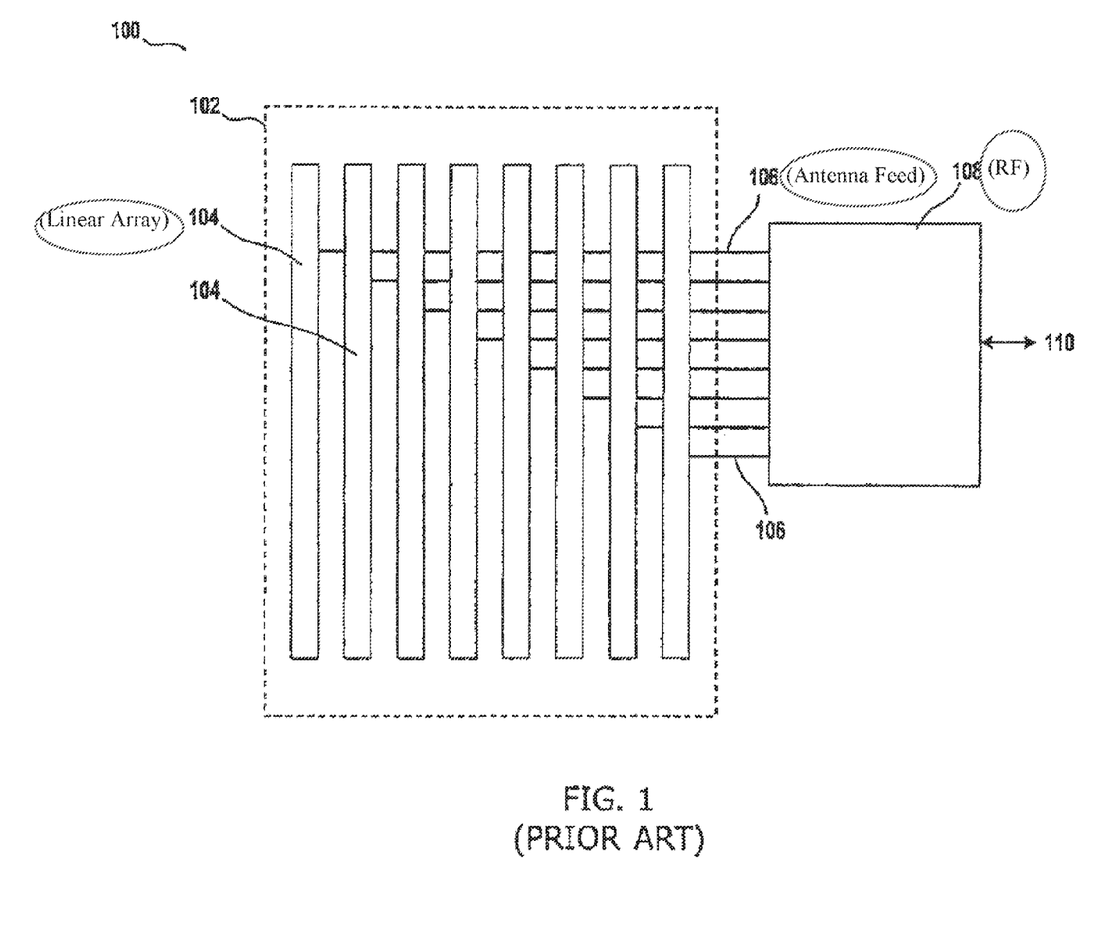
FIG. 1 shows a diagram of a conventional antenna array.

FIG. 1 shows a diagram of a conventional antenna array 100. The antenna array 100 includes several linear arrays 104 housed in a (non-metallic) radom 102. Here, each linear array 104 is arranged vertically with spacing between each other, which is determined by the desired resonant frequency of the antenna array 100. Each linear array 104 is connected to its associated radio frequency (RF) electronics circuitry contained in an external RF electronics module 108, via an antenna feed 106. The RF electronics module 108 is connected to external systems via a connection 110 for power, control, and communications connections; and may be physically mounted on the radom 102, or may be located remotely or outside of the antenna array 100.

An Electronically Scanned Array (ESA) is a type of phased array antenna, in which transceivers include a large number of solid-state transmit/receive modules. In ESAs, an electromagnetic beam is emitted by broadcasting radio frequency energy that interferes constructively at certain angles in front of the antenna. An active electronically scanned array (AESA) is a type of phased array radar whose transmitter and receiver (transceiver) functions are composed of numerous small solid-state transmit/receive modules (TRMs). AESA radars aim their beam by emitting separate radio waves from each module that interfere constructively at certain angles in front of the antenna.

Digital beamforming is a signal processing technique used in sensor or radar arrays for directional signal transmission or reception. Digital beamforming is attained by combining elements in a phased array in such a way that signals at particular angles experience constructive interference, while other signals experience destructive interference. Digital beamforming can be used at both the transmitting and receiving ends in order to achieve spatial selectivity. An advantage of digital beamforming is transmitting multiple simultaneous summed signals through each radar element.

Modern radar, radar jammer and communications antenna systems often require wideband frequency capability within constrained volume allocations. Electronically Scanned Array (ESA) antenna and Active Electronically Scanned Array (AESA) antenna designs provide dense-packed, high-reliability electronics. Moreover, there are growing interests to use digital beamforming to transmit two different types of signals simultaneously such as communications (comms) and radar, comms and electronic warfare (EW), or EW and radar. This requires spectrum sharing, that is, the two different types of signals, for example, an RF signal for military or radar applications, and a lower frequency (communication) signal for command and control applications, need to be simultaneously transmitted off a radar array.

Conventionally, these two types of signals are modulated into a single signal and the single modulated signal is amplified before it is transmitted by the radar array. However, the RF signal normally requires high power amplification, which is generally achieved by a high power amplifier (HPA) operating in its saturated region, while the lower frequency signal requires a lower amplification and needs the amplifier to operate in its linear region, not to miss any information from the signal.

The present invention enables an antenna array or any other transmitter to simultaneously transmit two or more combined signals out of the same antenna element with different power amplification levels for each signal to efficiently amplify a multi-carrier signal.

SUMMARY

In some embodiments, the present invention is an asymmetric power amplifier including: an input port for receiving a multi carrier signal including a first subcarrier and a second subcarrier; a first tunable analog filter for filtering the received multi carrier signal into a first signal of the first subcarrier; a second tunable analog filter for filtering the received multi carrier signal into a second signal of the second subcarrier; an amplifier for amplifying the first signal of the first subcarrier; a power amplifier for power amplifying the second signal of the second subcarrier; a combiner for power combining the amplified first signal and the amplified second signal to form a power combined multi carrier signal; and an output port for outputting the power combined multi carrier signal to be transmitted by a transmitter.

In some embodiments, the present invention is a method for digital beam forming of a transmit signal in a transmitter system. The method includes: receiving a multi carrier signal including a first subcarrier and a second subcarrier; filtering the received a multi carrier signal into a first signal of the first subcarrier and a second signal of the second subcarrier by two tunable analog filters, respectively; amplifying the first signal of the first subcarrier by an amplifier; power amplifying the second signal of the second subcarrier by a power amplifier; power combining the amplified first signal and the amplified second signal to form a power combined multi carrier signal; and transmitting the power combined multi carrier signal by a transmitter.

In some embodiments, the tunable analog filters are programmable analog finite impulse response (FIR) filters. In some embodiments, the combiner is a Wilkinson power combiner or a diplexer.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the present invention is an asymmetric power amplifier in a transmitter, for example in a phased array antenna, which splits an input signal into two or more frequency bands, using, for example, a (digitally) programmable analog finite impulse response (FIR) filter. Since the subcarriers may change broadly in frequency and content, the filter needs to be tuned/programmed, as the subcarriers change. The analog FIR filter is capable of filtering its input signal such that a single subcarrier is input into the power amplifier. This would avoid the inter modulation products that occur when multiple subcarriers are input to the power amplifier, particularly if the power amplifier is in saturation mode.

The frequency bands are individually amplified with different gain levels and combined with a power combiner. The combined signal is then fed into the transmitter (e.g., antenna array) feed. This allows a multi-carrier signal to be filtered such that each subcarrier is amplified individually creating much improved power efficiency.

Often, it is desired for the multiple different signals in a multi-carrier signal to be at vastly different power levels. However, when amplifying a multi-carrier signal through a single power amplifier, the efficiency goes down (efficiency being a measure of how much of the power source is usefully applied to the amplifier's output). This is because the high power amplification typically requires the amplifier to operate in the saturation region, while a low power amplifier needs to operate in its linear region to be most efficient. Trying to amplify the multi-carrier signals in saturation also causes intermodulation products/noise.

Figure 2:
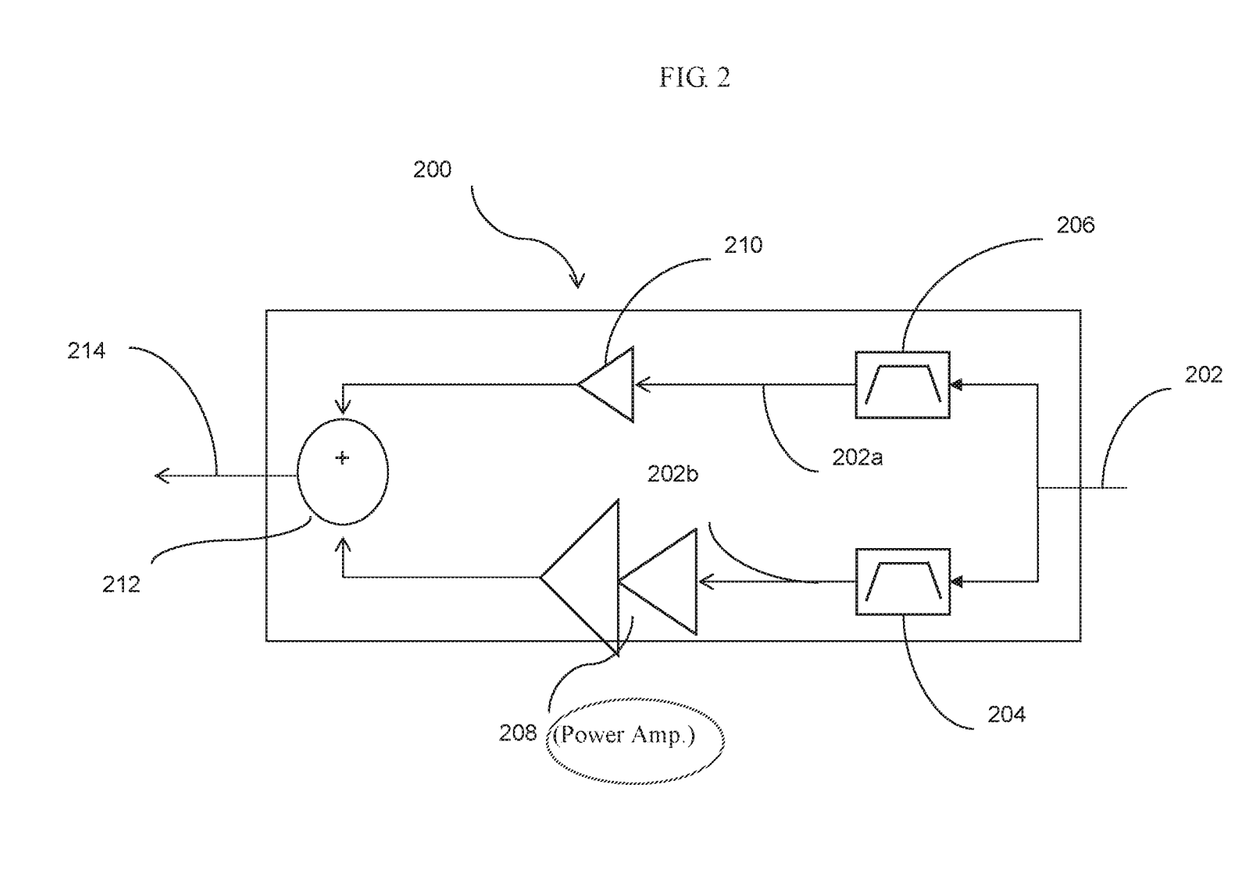
FIG. 2 is a simplified block diagram of an asymmetric power amplifier, according to some embodiments of the present invention.

FIG. 2 is a simplified block diagram of an asymmetric power amplifier 200, according to some embodiments of the present invention. As shown, an incoming multi-carrier signal 202 is filtered out by its subcarriers using two filters 204 and 206 to split the multi-carrier signal 202 into two frequency bands. The filters 204 and 206 are independently programmable to allow independent frequency bands, filter shape, filter coefficients, gain, phase, and output signals. The filters 204 and 206 are analog tunable/programmable filers, for example programmable analog FIR filters; or the like. In the case of programmable analog FIR filters, the filters can be programmed for filtering different (arbitrary) frequencies (subcarriers) and therefore expands the application of the asymmetric power amplifier for various signals of different subcarriers.

The output 202a of the filter 206 is the lower frequency signal that is then amplified by an amplifier 210, such as a class A/B amplifier. Similarly, the output 202b of the filter 204 is the higher frequency signal that is power amplified by the high power amplifier (HPA) 208, independent of the amplification of the 202a signal. Although, FIG. 2 and the disclosure describe an incoming multi-carrier signal with two subcarriers being filtered by two tunable filters, those skilled in the art would readily recognize that the asymmetric power amplifier of the present invention is not limited to filtering (and combining) two subcarriers, and thus other number of subcarriers and filters, for example, 3, 4 or more, are possible and within the scope of the present invention.

Figure 6:
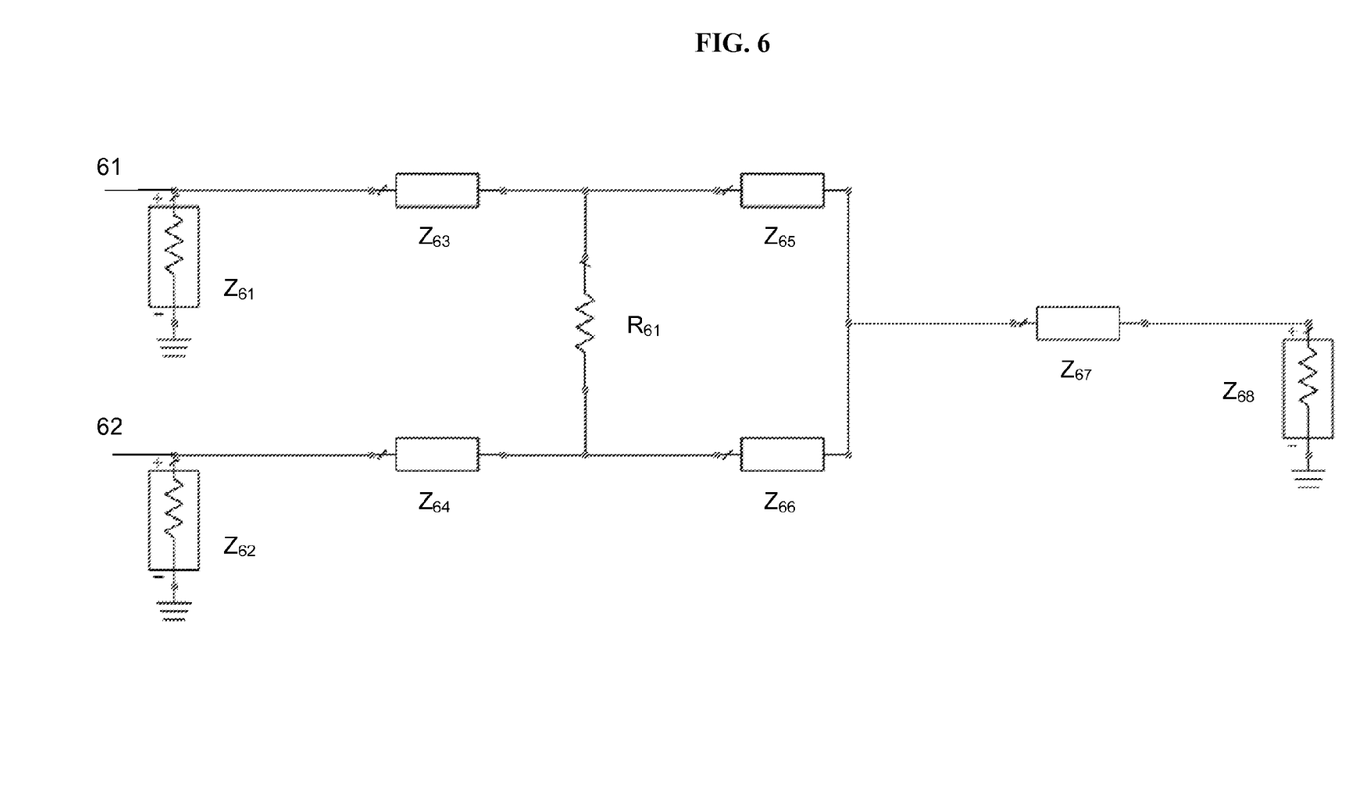
FIG. 6 is a simplified circuit diagram of Wilkinson power combiner, according to some embodiments of the present invention.
Figure 7:
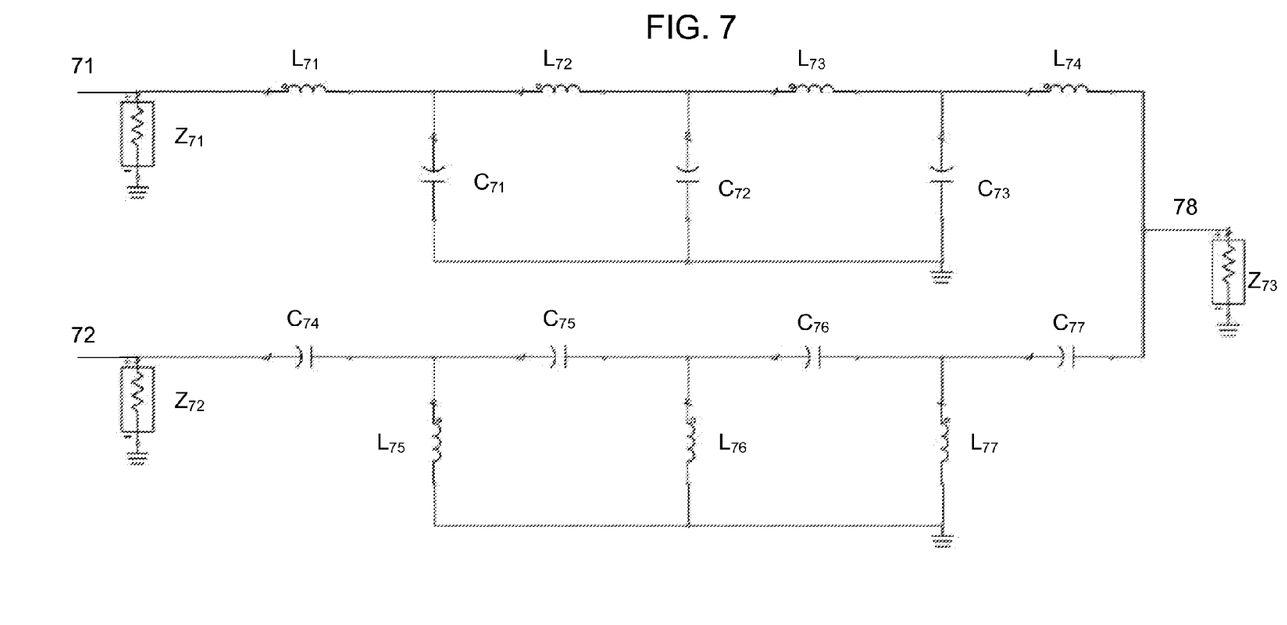
FIG. 7 is a simplified circuit diagram of a diplexer circuit, according to some embodiments of the present invention.

The two amplified signals are then combined by a combiner 212 into a single output signal 214. This way, the two subcarriers of the incoming multi-carrier signal 202 are asymmetrically and individually amplified with amplifiers that can be customized for each subcarrier and then power combined together resulting in much power efficiency. The combiner 212 is impedance matched for different input powers. That is, the combiner 212 achieves isolation between the output port while maintaining a matched condition on all ports. In some embodiments, the combiner 212 may be a Wilkinson power combiner or a diplexer circuit. A Wilkinson power combiner and a diplexer circuit are depicted in FIGS. 6 and 7, respectively and explained below, according to some embodiments of the present invention.

In some embodiments, the asymmetric power amplifier has the same input/output configuration as those of the standard or typical power amplifiers, so that the device embodying aspects of the asymmetric power amplifier can be dropped in and replace the standard power amplifiers, in various systems.

Figure 3:
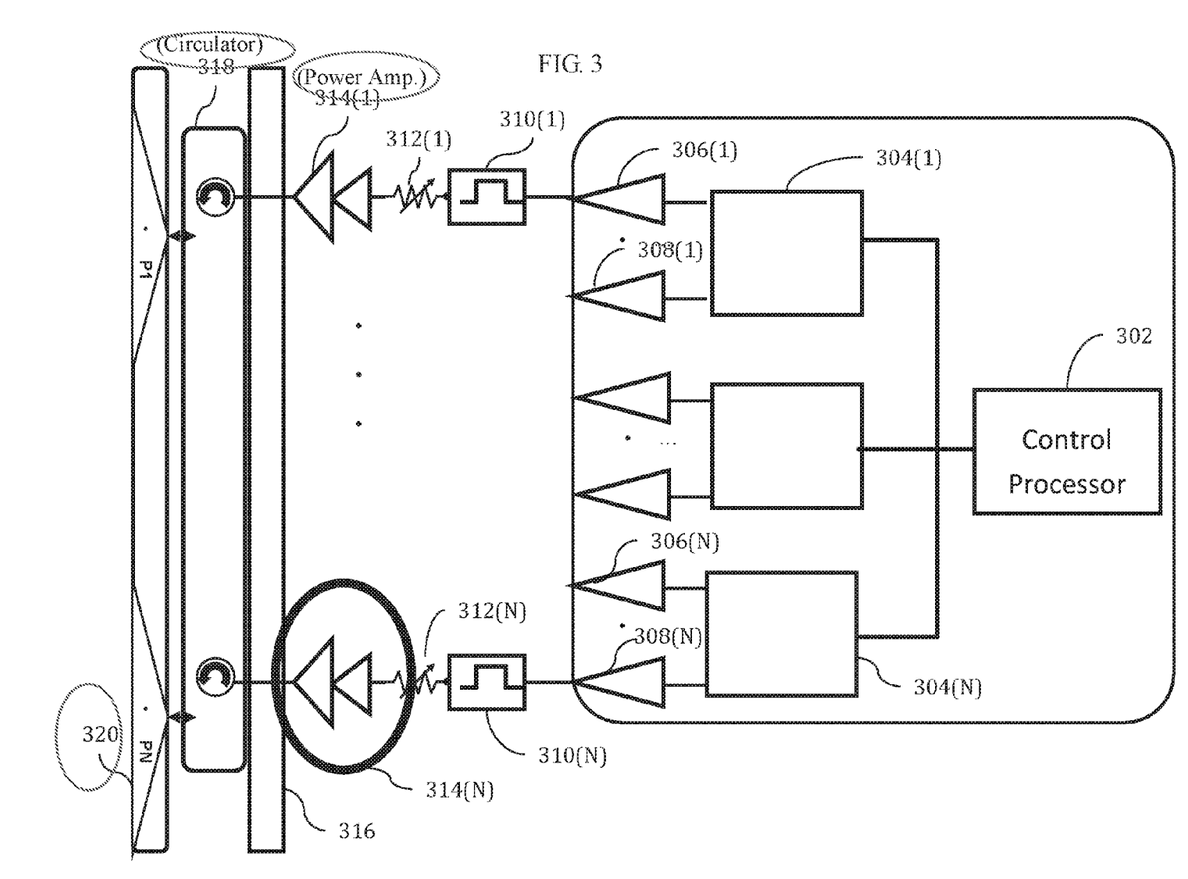
FIG. 3 is a simplified block diagram of an antenna array using asymmetric power amplifiers, according to some embodiments of the present invention.

FIG. 3 is a simplified block diagram of an antenna array using asymmetric power amplifiers, according to some embodiments of the present invention. The exemplary antenna array may an Electronically Scanned Array (ESA) antenna utilized by a radar system. As shown, a control processor 302 controls the operations of a plurality of beam forming module or circuits 304(1) to 304(N). Each beam forming module 304 performs various signal processing and waveform generations tasks, controlled by the control processor 302. In this example, each beam forming module drives a pair of Digital-to-Analog Convertors (DACs) 306. Each DAC 306 converts the digital output from a respective beam forming module 304 and converts it to an analog signal, which is then filtered by a respective bandpass filter 310.

In digital beamforming applications, often multiple carriers are required to be transmitted per element in the array. In some cases, two totally different signal types such as a radar signal and a communications signal are combined and transmitted per element. When multiple carriers or multiple signals are transmitted through a power amp, intermodulation distortion occurs, and in some cases information loss in the signal can occur due to amplitude or phase distortion. The bandpass filters 310 are used to separate the two or more carriers or signals such that they can be amplified through a power amp without intermodulation distortion and with correct amplitude and phase. In some embodiments, the gain of each of the outputs of the bandpass filters 310(1) to 310(N) are then controlled by a respective Automatic Gain Controller (AGC) 312(1) to 312(N) to allow optimal input power into the high power amplifier stage.

The outputs of each of the AGC 312(1) to 312(N) are then input to a respective asymmetric power amplifier 314 of the present invention. Each of the asymmetric power amplifiers 314(1) to 314(N) filters its input signal (output from a respective AGC) into two or more frequency bands, using, for example, a programmable analog FIR filter. The frequency bands are then individually amplified with different gain levels and combined with a power combiner, within the asymmetric amplifier, as explained with respect to FIG. 2. The combined signal is then fed into a cold plate 316 of the antenna array.

In some embodiments, the cold plate 316 directs each (power combined) signal to a respective radar circulator 318, for example, a multi-polarized circulator, which are then transmitted through a radar aperture 320. This way, the antenna array, or any other type of transmitter, is capable of simultaneously transmitting two or more combined signals out of the same antenna element with different power amplification levels for each signal to efficiently amplify a multi-carrier signal.

In some embodiments, the input/output of the asymmetric power amplifiers 314(1)-314(N) are identical to those of the currently available amplifiers for an easy and efficient drop and replacement operation for upgrading and enhancing the operation of the transmitter or in this case, the antenna array.

Figure 4:
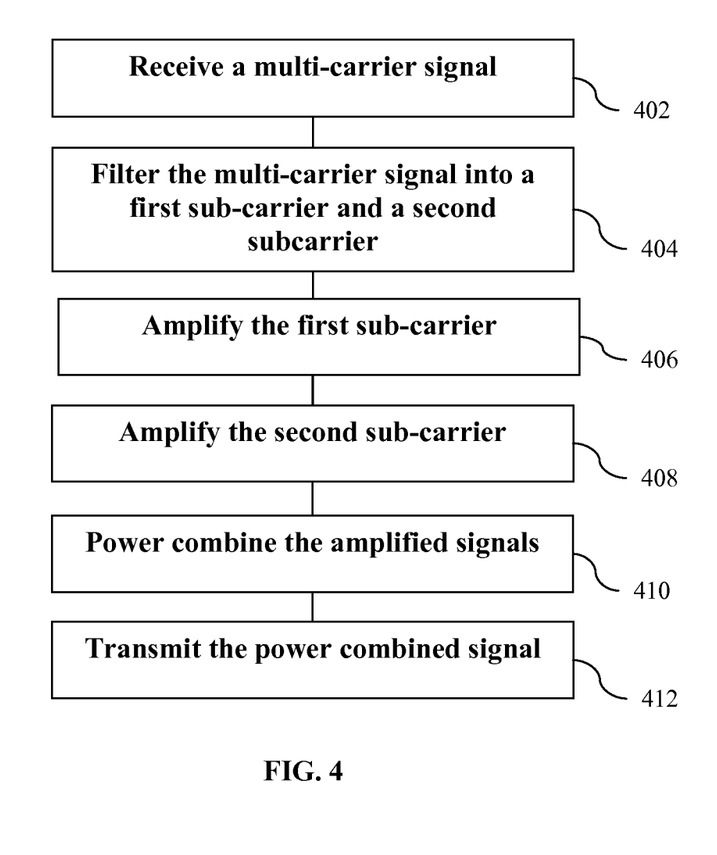
FIG. 4 is a simplified process flow, according to some embodiments of the present invention.

FIG. 4 is a simplified process flow, according to some embodiments of the present invention. In some embodiments, the method is for digital beamforming of a transmit signal in a transmitter system. A multi carrier signal including a first subcarrier and a second subcarrier is received, in block 402. The first subcarrier may be a lower frequency than the second subcarrier. The multi carrier signal is filtered into a first signal of the first subcarrier and a second signal of the second subcarrier, in block 404. As explained above, the filtering into two (or more) subcarriers may be performed by two respective tunable/programmable analog filters, for example two programmable analog FIR filters. In block 406, the first signal of the first subcarrier is amplified by a first amplifier to generate an amplified first signal of the first carrier. In block 408, the second signal of the second subcarrier is amplified by a second amplifier to generate an amplified second signal of the second carrier.

The amplifications of the two signals are performed independent of each other by two separate and different types of amplifiers. For example, the first signal may be amplified by a class A/B amplifier operating in its linear region and the second signal may be powered amplified by a power amplifier, for example a class D amplifier. In block 410, the two amplified signals are power combined to generate a power combined multi carrier signal. The power combined multi carrier signal is then transmitted by the antenna of the transmitter system, in block 412. As a result, the two subcarriers of the input multi-carrier signal are amplified in a different manner, power combined together and simultaneously transmitted out of the transmitter system.

Figure 5:
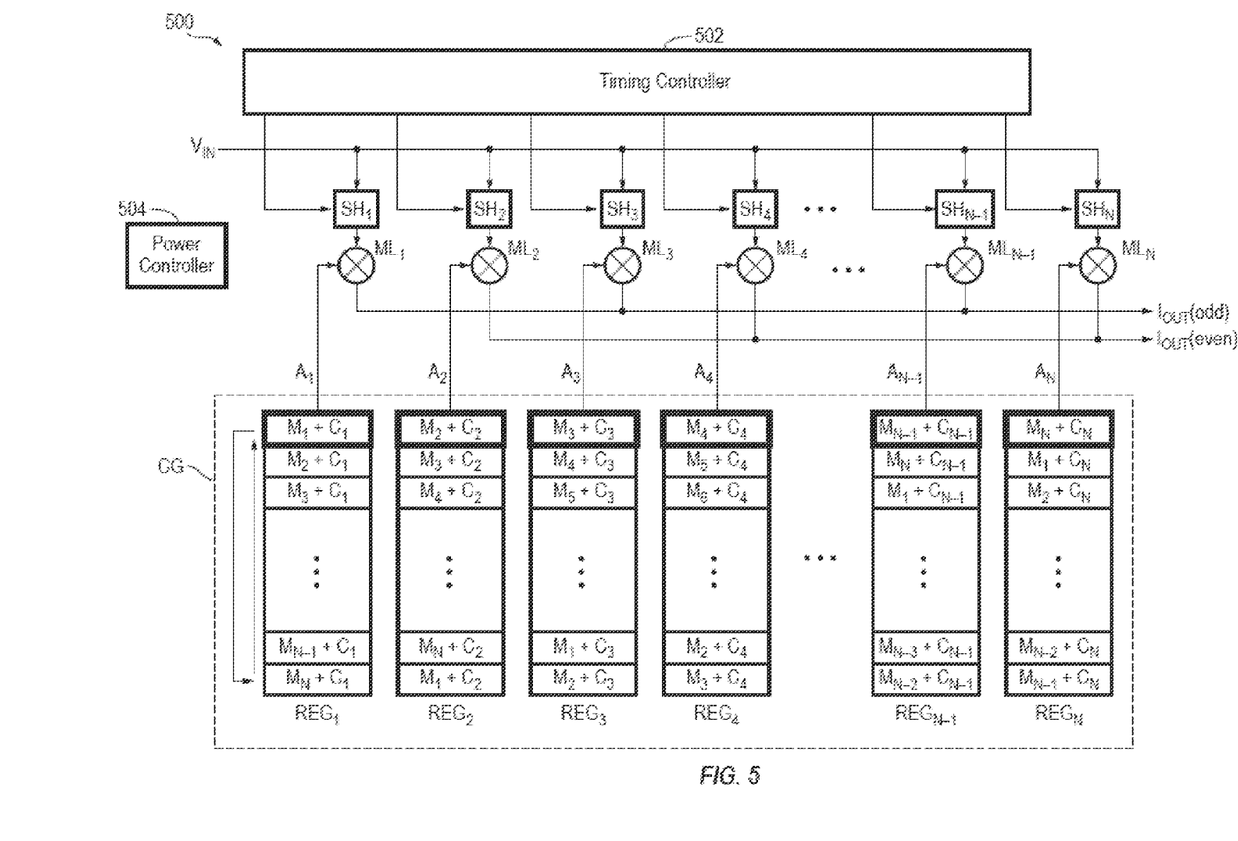
FIG. 5 is a simplified block diagram of an analog finite impulse response (FIR), according to some embodiments of the present invention.

FIG. 5 is a simplified block diagram of an analog finite impulse response (FIR), according to some embodiments of the present invention. As shown, the analog FIR filter 500 has N taps (N being an integer greater than 1) and includes a plurality of sample and hold (S/H) circuits $SH_1$ to $SH_N$ for sampling and holding an input voltage signal for a period of time (e.g., one time unit), a plurality of analog multipliers $ML_1$ to $ML_N$ for converting the respective voltages sampled by the S/H circuits $SH_1$ to $SH_N$ to an amplified current signal, and a plurality of coefficient registers $REG_1$ to $REG_N$ for providing appropriate multiplication factors (or multiplication coefficients) to the analog multipliers $ML_1$ to $ML_N$.

In some embodiments, the timing of the sample and hold operation of the S/H circuits $SH_1$ to $SH_N$ may be controlled by a timing controller (or clock signal generator) 502, which generates a plurality of staggered control (or enable/clock) signals (e.g., enable/clock signals that are delayed/shifted in time), such that only one of the S/H circuits $SH_1$ to $SH_N$ samples the input voltage signal $V_{IN}$ at any given period. Thus, the sampled voltage signals supplied to successive ones of the analog multipliers $ML_1$ to $ML_N$ by the S/H circuits $SH_1$ to $SH_N$ will be delayed in time by one sampling period (e.g., inverse of sampling frequency). Further, when a S/H circuit $SH_k$ ($1 \le k \le N$) samples the input voltage signal $V_{IN}$, the sampled voltage signal is maintained at the output of S/H circuit $SH_k$ for a period of N clock cycles, after which point the S/H circuit unit $SH_k$ resamples the input voltage signal $V_{IN}$. In some examples, the input voltage signal $V_{IN}$ may be a continuous-time analog signal or may be a discrete-time analog signal (e.g., a sampled continuous-time signal). The analog FIR filter 500 exhibits less signal distortion as those of the related art. Further, as the analog multipliers $ML_1$ to $ML_N$ output current signals (rather than voltage signals), their outputs may be added simply by connecting the output ports of the analog multipliers $ML_1$ to $ML_N$ together.

The analog FIR filter is programmable. According to some embodiments, each of the plurality of coefficient registers (e.g., coefficient look-up tables) $REG_1$ to $REG_N$ stores a plurality of coefficients, which represent multiplication factors applied by analog multipliers $ML_1$ to $ML_N$ to generate the output signal $I_{OUT}$. In some examples, the each of the coefficient registers $REG_1$ to $REG_N$ store the same N coefficients (e.g., un-calibrated coefficients) $M_1$ to $M_N$, however, the coefficients may be staggered. That is, a coefficient $M_i$ (i being an integer from 1 to N) may occupy a first memory position in $REG_i$, a second memory position in $REG_{i+1}$, and so forth. Similarly, a coefficient $M_{i+1}$ may occupy a second memory position in $REG_i$, a third memory position in $REG_{i+1}$, and so forth.

In some embodiments, each of the coefficient registers may be implemented as rotating shift registers in which the coefficients are rotated (e.g., circularly rotated) through the shift register memory positions at each sample time, that is, by moving the final entry to the first position, while shifting all other entries to the next position, or by performing the inverse operation. The circular shift of the coefficients may occur in synchronization with the S/H circuits $SH_1$ to $SH_N$. In some examples, the timing of the coefficient registers $REG_1$ to $REG_N$ may be controlled by the timing controller 502. A more complete explanation of an analog programmable FIR filter is provided in a co-owned pending U.S. application Ser. No. 14/849,529 entitled "Discrete Time Current Multiplier Circuit,", the entire contents of which is hereby expressly incorporated by reference.

FIG. 6 is a simplified circuit diagram of Wilkinson power combiner, according to some embodiments of the present invention. The power combiner allows power combining that is frequency independent and provides isolation between the outputs of the power amplifier. The power combiner can be realized with arbitrary power combining such that symmetric or antisymmetric sources at the inputs, 61 and 62, have losses through the network that are pre-defined within the given design. As shown, the circuit is driven by two independent input signals with impedances Z62 and Z61. For even-mode excitation, these signals are of the same frequency and proper power ratio, so that near lossless power combining occurs at the circuit output Z68. For odd-mode excitation, the input signals are of different frequencies or improper power ratio, and a pre-defined amount of power is absorbed into the resistor R61, while the remaining power is combined at the circuit output Z68. The remaining components of the Wilkinson power combiner, Z63, Z64, Z65, Z66 and Z67, provide matched input impedances to Z61 and Z62, from the circuit output impedance Z68.

Although, the Wilkinson power combiner circuit shown in FIG. 6 has two inputs, those skilled in the art would recognize that a multi-input Wilkinson power combiner circuit is also realizable and within the scope of the present invention. That is, in the case of a multi carrier signal with subcarriers, multiple power amplifiers and a multi-input Wilkinson power combiner circuit would replace the two power amplifiers and the two-input Wilkinson power combiner circuit, shown in FIG. 6.

FIG. 7 is a simplified circuit diagram of a diplexer circuit, according to some embodiments of the present invention.

This diplexer circuit incorporates low-pass and high-pass filters for filtering and then combining a low band and a high band inputs from the amplifier outputs. As shown, inductors L71, L72, L73 and L74; and capacitors C71, C72 and C73 are arranged to form a low-pass filter for the low band operation with an input impedance matched to Z71 (for example a 50 Ohm impedance). The values for the inductors and capacitors are selected in such a way to provide an impedance matched circuit to the power amplifier at low band frequencies, while also providing an effective open circuit at high band frequencies.

Similarly, capacitors C74, C75, C76 and C77; and inductors L75, L76 and L77 are arranged to form a high-pass filter for the high band operation with an input impedance matched to Z72. The values for the inductors and capacitors are selected in such a way to provide an impedance matched circuit to the power amplifier at high band frequencies, while also providing an effective open circuit at low band frequencies. The outputs of the low-pass filter and the high-pass filter are then combined independently due to the inherent isolation between the filters and form a common port 78 that is matched to a load impedance of Z73.

Although, the diplexer combiner circuit shown in FIG. 7 has two inputs, those skilled in the art would recognize that a circuit containing a filter bank of low, high and band pass filters is also realizable and within the scope of the present invention. That is, in the case of a multi carrier signal with subcarriers, multiple power amplifiers and a filter bank power combiner circuit would replace the two power amplifiers and the diplexer power combiner circuit, shown in FIG. 7.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

What is claimed is:

1. An asymmetric power amplifier comprising:
   an input port for receiving a multi carrier signal including a first subcarrier and a second subcarrier;
   a first tunable analog filter for filtering the received multi carrier signal into a first signal of the first subcarrier;
   a second tunable analog filter for filtering the received multi carrier signal into a second signal of the second subcarrier;
   an amplifier for amplifying the first signal of the first subcarrier;
   a power amplifier for power amplifying the second signal of the second subcarrier;
   a combiner for power combining the amplified first signal and the amplified second signal to form a power combined multi carrier signal; and
   an output port for outputting the power combined multi carrier signal to be transmitted by a transmitter.

2. The asymmetric power amplifier of claim 1, wherein the first and second tunable analog filters are programmable analog finite impulse response (FIR) filters.

3. The asymmetric power amplifier of claim 1, wherein the combiner is a Wilkinson power combiner.

4. The asymmetric power amplifier of claim 1, wherein the combiner is a diplexer circuit.

5. The asymmetric power amplifier of claim 1, wherein the transmitter is a radar array.

6. The asymmetric power amplifier of claim 1, wherein the amplifier is a class NB amplifier.

7. The asymmetric power amplifier of claim 1, wherein the power amplifier is a class D amplifier.

8. A method for digital beam forming of a transmit signal in a transmitter system, the method comprising:
   receiving a multi carrier signal including a first subcarrier and a second subcarrier;
   filtering the received a multi carrier signal into a first signal of the first subcarrier and a second signal of the second subcarrier by two tunable analog filters, respectively;
   amplifying the first signal of the first subcarrier by an amplifier;
   power amplifying the second signal of the second subcarrier by a power amplifier;
   power combining the amplified first signal and the amplified second signal to form a power combined multi carrier signal; and
   transmitting the power combined multi carrier signal, by a transmitter.

9. The method of claim 8, wherein the two tunable analog filters are programmable analog finite impulse response (FIR) filters.

10. The method of claim 8, wherein the power combining is performed by a Wilkinson power combiner.

11. The method of claim 8, wherein the power combining is performed by a diplexer circuit.

12. The method of claim 8, wherein the transmitter comprises of radiating elements of an antenna system for a radar array.

13. The method of claim 8, wherein the amplifier is a class NB amplifier.

14. The method of claim 8, wherein the power amplifier is a class D amplifier.

* * * * *